US008185645B2

(12) United States Patent
Maruhashi et al.

(10) Patent No.: US 8,185,645 B2
(45) Date of Patent: May 22, 2012

(54) CONTENT DELIVERY SYSTEM USING WIRELESS PORTABLE TERMINAL AND DELIVERY METHOD THEREFOR

(75) Inventors: Kenichi Maruhashi, Tokyo (JP); Shuya Kishimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 157 days.

(21) Appl. No.: 12/514,844

(22) PCT Filed: Nov. 14, 2007

(86) PCT No.: PCT/JP2007/072075
§ 371 (c)(1),
(2), (4) Date: May 14, 2009

(87) PCT Pub. No.: WO2008/059861
PCT Pub. Date: May 22, 2008

(65) Prior Publication Data
US 2010/0064050 A1  Mar. 11, 2010

(30) Foreign Application Priority Data
Nov. 14, 2006 (JP) .................................. 2006-307905

(51) Int. Cl.
*G06F 15/16* (2006.01)
(52) U.S. Cl. ...................................... 709/229; 709/226
(58) Field of Classification Search ........ 9/203, 217–219, 9/225, 227, 229; 709/203, 217–219, 225, 709/227, 229; 455/411
See application file for complete search history.

(56) References Cited

U.S. PATENT DOCUMENTS

| 6,671,879 B1* | 12/2003 | Schlarb et al. ................ 725/8 |
| 7,167,712 B2* | 1/2007 | Ogino et al. ............. 455/456.1 |
| 7,260,079 B1* | 8/2007 | Chapman et al. ............ 370/338 |
| 7,533,158 B2* | 5/2009 | Grannan et al. ............. 709/219 |
| 7,644,163 B2* | 1/2010 | Gustafsson .................. 709/227 |
| 2002/0032024 A1 | 3/2002 | Namba et al. |
| 2002/0198963 A1* | 12/2002 | Wu et al. ..................... 709/219 |
| 2003/0195905 A1* | 10/2003 | Morohashi .................. 707/204 |
| 2004/0143652 A1* | 7/2004 | Grannan et al. ............. 709/223 |
| 2005/0085258 A1* | 4/2005 | Ishii et al. ................. 455/552.1 |
| 2005/0276610 A1 | 12/2005 | Hirayama |
| 2007/0198674 A1* | 8/2007 | Li et al. ....................... 709/223 |
| 2009/0204815 A1* | 8/2009 | Dennis et al. ............... 713/168 |

FOREIGN PATENT DOCUMENTS

| JP | 2001-103020 | 4/2001 |
| JP | 2002-095045 | 3/2002 |
| JP | 2003-014472 | 1/2003 |

(Continued)

*Primary Examiner* — Faruk Hamza
(74) *Attorney, Agent, or Firm* — Young & Thompson

(57) ABSTRACT

To reduce time to point a directional wireless portable terminal (WPT) to an access point (AP) when data is downloaded from the AP to the WPT, a user points the WPT to the AP, performs a first operation and transmits a request of authentication and download to the AP. The AP requests a server to perform the authentication and the download. The server transmits information on a current situation to the AP. The AP calculates time required until the download can be started based on content capacity and the like and transmits information on the calculated time to the WPT. The WPT displays countdown until the download can be started. During that time, the server performs the authentication and, if successful, delivers content to the AP. When the download can begin, the user performs a second operation and transmits a request of re-authentication and download to the AP.

18 Claims, 10 Drawing Sheets

FOREIGN PATENT DOCUMENTS

| | | |
|---|---|---|
| JP | 2004-058631 | 2/2004 |
| JP | 2004-147228 | 5/2004 |
| JP | 2005-039787 | 2/2005 |
| JP | 2005-159958 | 6/2005 |
| JP | 2005-252819 | 9/2005 |
| JP | 2005-339023 | 12/2005 |
| JP | 2005-339025 | 12/2005 |

* cited by examiner

CONTENT DELIVERY SYSTEM USING WIRELESS PORTABLE TERMINAL AND DELIVERY METHOD THEREFOR

BACKGROUND OF THE INVENTION

1. Field of the Invention

The present invention relates to a content delivery system using a portable terminal having a directional wireless device mounted therein.

2. Description of the Related Art

In recent years, portable devices such as a portable telephone, a personal digital assistance (PDA), a personal computer (PC), a handheld gaming device, a portable video player and a portable music player have been increasingly used. A small-sized hard disk drive, a flash memory or the like is included in such a portable device and various types of data such as large volumes of audio and video data are stored in the small-sized hard disk drive, the flash memory or the like. These pieces of data are mainly downloaded from such a medium as the Internet, a CD or a DVD by wired connection. Although demand for use of wireless connection rises because of cumbersomeness of the wired connection, a high-speed wireless technique is required to download large volumes of data in short time. If this technique is put to practical use, a user can easily acquire the data at a shop, a convenience store or the like away from home and reproduce voice or video on the spot or take out the data and transfer the data to a user's PC or a server.

If data is downloaded to a wirelessly connectable portable device (hereinafter, "wireless portable terminal"), a wireless technique ensuring relatively long-distance coverage such as a portable telephone or a wireless LAN, Infrared Data Association (IrDA) or Near Field Communication (NFC) is usually used. However, a line speed is confined to several tens of Mbps or less for each of these usual techniques. Therefore, a millimeter-wave wireless technique that can realize wireless transmission at a line speed exceeding one Gbps using broadband is desired. The millimeter wave means an electromagnetic wave at a frequency from 30 GHz to 300 GHz.

Meanwhile, it is necessary to use antenna directionality for the millimeter-wave wireless communication and necessary for a user to direct, that is, point an antenna axis of the wireless portable terminal to the access point. FIG. 10 is a schematic diagram of a content delivery system disclosed in Japanese Patent Application Laid-Open No. 2005-339025 (FIG. 1). A terminal transmitter 104 (corresponding to an access point) can deliver a content to a counterpart in an area by light irradiation. A user points a portable receiving terminal 101 disposed in the area to the terminal transmitter 104 using a positioning mechanism so as to point an index laser beam emitted from an index laser 103 mounted in the portable receiving terminal 101 to the portable transmitter 104. In the example shown in FIG. 10, it is necessary to dispose the portable receiving terminal 101 in a visible range of a visual recognition light irradiated from a light guide 105 and the portable receiving terminal 101 includes means for irradiating the laser beam emitted from the index laser 103 onto the terminal transmitter 104. The user needs to make position adjustment (perform pointing) while observing the laser beam. That is, if pointing is to be successfully performed, it is necessary to dispose the portable receiving terminal 101 in a millimeter-wave receivable range and adjust a mounting angle of the portable receiving terminal 101 so that a millimeter-wave receiver can receive a millimeter wave from a millimeter-wave transmitter.

If a line speed of one Gbps can be realized, the user can download even data with a capacity of 640 megabytes (MB) corresponding to a capacity of CD-ROM completely in about five seconds. For such a short time, the user can keep holding communication between the access point and the wireless portable terminal with the wireless portable terminal in his or her hand and without disposing the wireless portable terminal in the receivable area. K. Maruhashi et al., "Wireless uncompressed-HDTV-signal transmission system utilizing compact 60-GHz-band transmitter and receiver", IEEE MTT-S International Microwave Symposium, Digest, pp. 1867-1870, June, 2005 discloses an instance of transmitting data by a distance of seven meters (m) at a speed of about one Gbps when using a relatively wide-angle antenna having a beam angle of 30 degrees in a horizontal direction and 15 degrees in a vertical direction. If a user uses a wireless portable terminal at, for example, a shop or a convenience store and downloads data from a shop-side access point to the wireless portable terminal, the system disclosed therein is sufficiently practical with the distance and pointing accuracy.

If this operation is carried out, it takes some time to perform authentication, transmission between a server and the access point and the like essential for the download. During that time, the user keeps pointing the wireless portable terminal to the access point. The access point is connected to the server that is normally disposed far away from the access point via a terrestrial line. For facilitating disposing of the access point and the like, the access point is often connected to not a dedicated line but the existing Internet network. In that case in which bandwidth is not guaranteed for data transmission, it takes much longer communication time to hold a communication between the server and the access point than time required for net download between the access point and the wireless portable terminal.

SUMMARY OF THE INVENTION

It is an object of the present invention to provide a content delivery system and a content delivery method that can make it unnecessary to keep pointing a directional wireless portable terminal to an access point since start of a request of download until completion of the download and that can make a user stress free if data is downloaded from the access point using the directional wireless portable terminal.

It is another object of the present invention to provide a content delivery system and a content delivery method that can make a user comfortably wait for a period since a request of download until start of download of data to a wireless portable terminal and that enables a service provider to provide advertising information.

According to one aspect of the present invention, there is provided a content delivery system, which includes a wireless portable terminal that includes a directional wireless carrier transmitter and a directional millimeter-wave receiver, an access point that transmits or receives a content to or from the wireless portable terminal, and a server that delivers the content to the access point, the system including: a unit transmitting a signal indicating a request of authentication and download to the server via the access point by a first operation at the wireless portable terminal, the first operation being clicking; a unit delivering the content to the access point and accumulating the content in the access point if the authentication is successful; and a unit delivering the content accumulated in the access point to the wireless portable terminal by a second operation at the wireless portable terminal, the second operation being the clicking.

According to another aspect of the present invention, there is provided a content delivery method for a content delivery system that includes a wireless portable terminal that includes a directional wireless carrier transmitter and a directional millimeter-wave receiver, an access point that transmits or receives a content to or from the wireless portable terminal, and a server that delivers the content to the access point, the method including: performing a first operation at the wireless portable terminal, the first operation being clicking; transmitting a signal indicating a request of authentication and download to the server via the access point; delivering the content to the access point and accumulating the content in the access point if the authentication is successful; performing a second operation at the wireless portable terminal, the second operation being the clicking; and delivering the content accumulated in the access point to the wireless portable terminal.

A first advantage of the present invention is as follows: If data is downloaded from the access point using the directional wireless portable terminal, it is unnecessary to keep pointing the wireless portable terminal to the access point and a user can be made stress free.

A second advantage of the present invention is as follows: The user can comfortably wait for a period since a request of download until start of download of data to the wireless portable terminal and a service provider is enabled to provide advertising information.

DESCRIPTION OF THE PREFERRED EMBODIMENT

Figure 1:
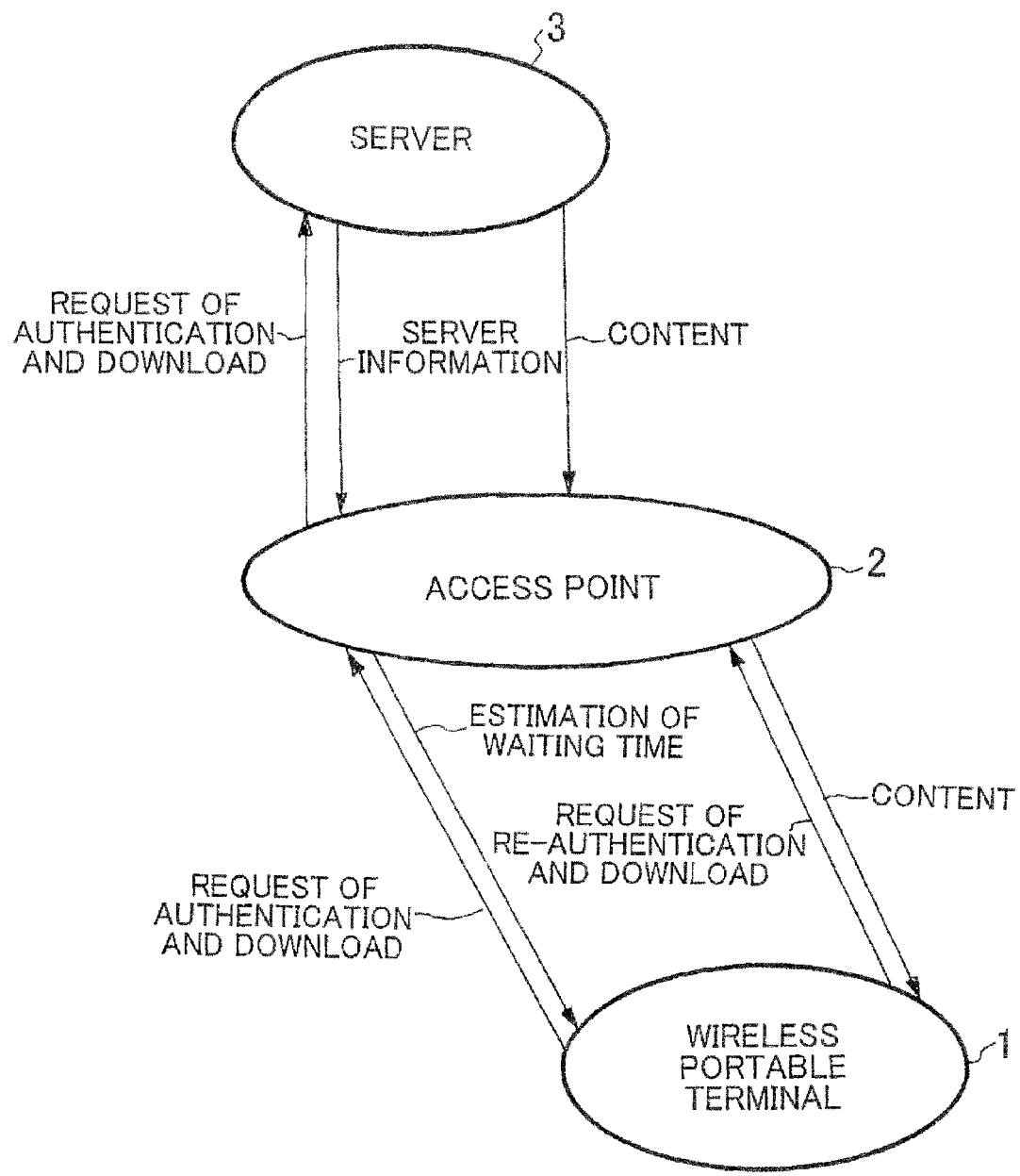
FIG. 1 is a schematic diagram showing a configuration of a content delivery system used in embodiments of the present invention.

A first embodiment of the present invention will be described in detail with reference to the drawings. FIG. 1 is a schematic diagram of a content delivery system according to embodiments of the present invention. A wireless portable terminal 1, which is a portable telephone, a PDA, a gaming device or the like, includes a function of wirelessly downloading large volumes of data from an outside. The portable telephone in the embodiments of the present invention includes not only an original function of realizing a voice service using radio frequency but also another wireless interface. An access point 2, which is disposed in a shop, outdoor or the like, transmits or receives data to or from the wireless portable terminal 1 and transfers a content from a server 3 to the wireless portable terminal 1.

Figure 2:
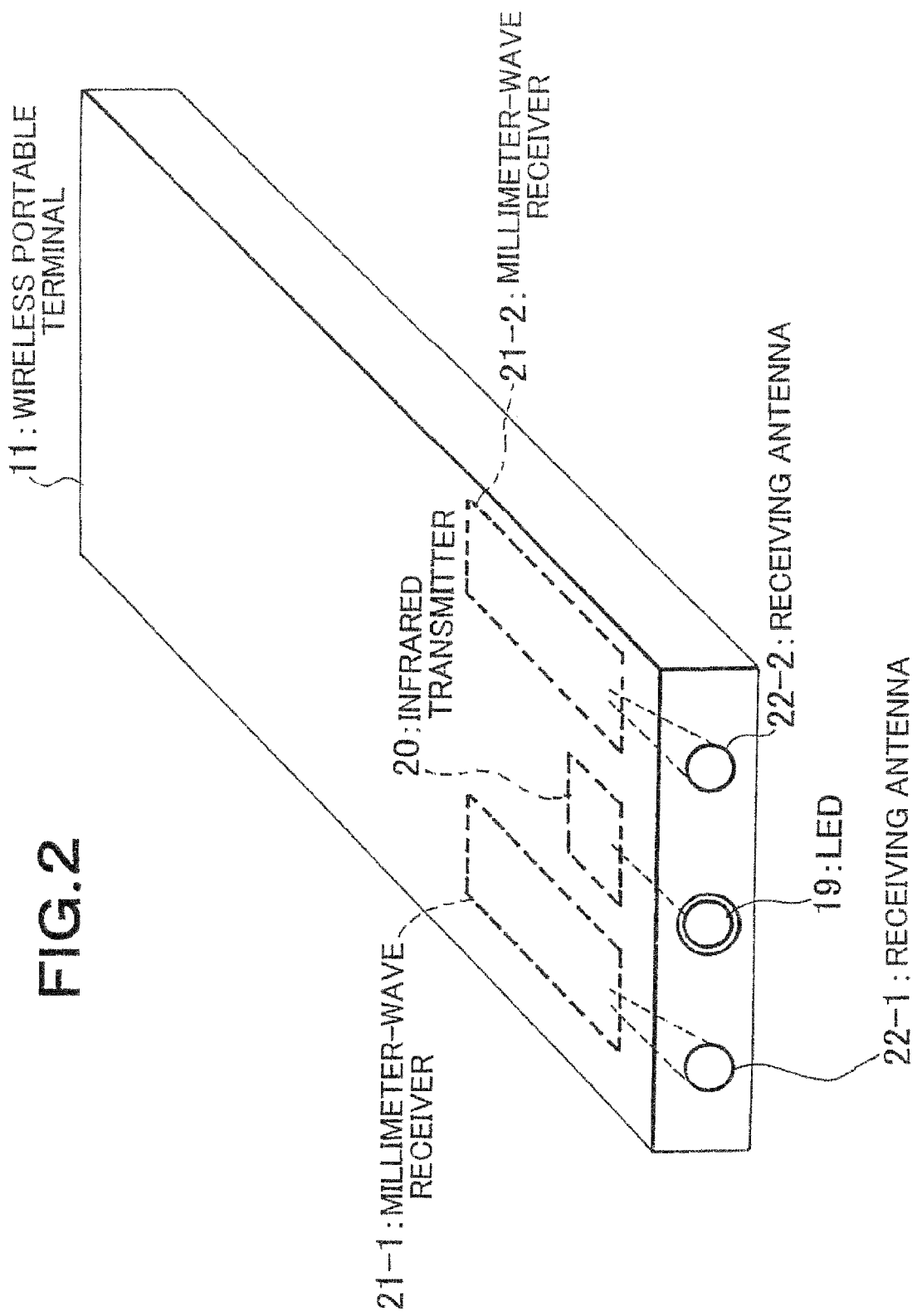
FIG. 2 is a configuration diagram showing a detailed configuration of a wireless portable terminal according to a first embodiment of the present invention.
Figure 3:
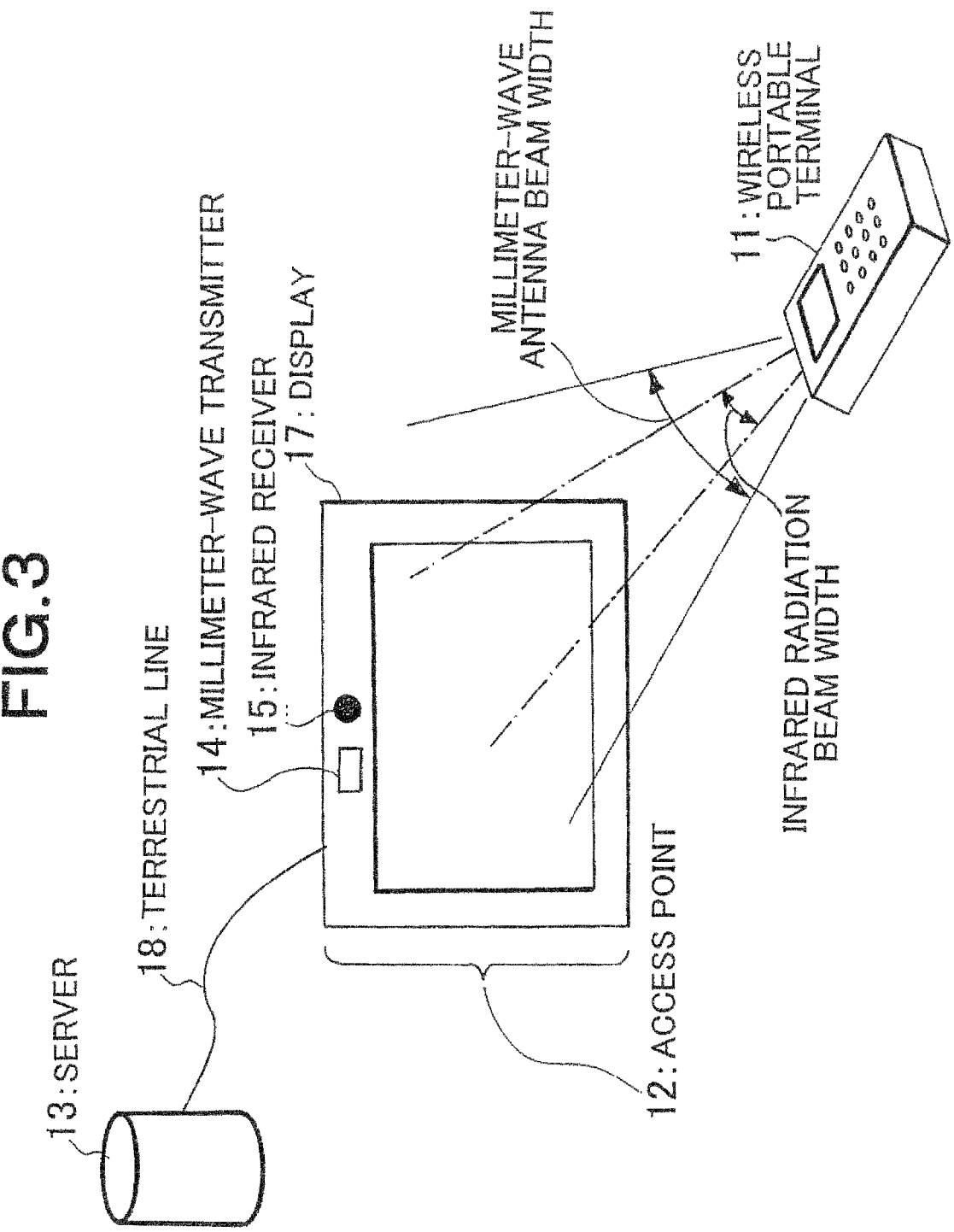
FIG. 3 is a schematic diagram showing a configuration of a content delivery system according to the first embodiment.

FIG. 2 shows a detailed configuration of a wireless portable terminal 11 according to the first embodiment. The wireless portable terminal 11 includes an infrared LED 19 and an infrared transmitter 20. The wireless portable terminal 11 also includes millimeter-wave receivers 21-1 and 21-2 and antennas 22-1 and 22-2. The antennas 22-1 and 22-2 are directional antennas oriented in the same direction as that of the infrared LED 19. The reason for using two antennas is to suppress multipath interference that becomes conspicuous particularly if a beam width is set large for indoor transmission by adopting diversity reception. However, the number of antennas to be used in the present embodiment is not limited to two but one antenna or three or more antennas may be used. FIG. 3 is a schematic diagram showing a configuration of a content delivery system according to the first embodiment. Although a mode of an access point 12 is not limited to a specific one, the access point 12 includes, for example, a display 17 (or a poster) displaying information indicating that a download service is available, a millimeter-wave transmitter 14 and an infrared receiver 15 which are arranged near the display 17. The access point 12 is connected to a server 13 that delivers a content by, for example, a terrestrial line 18. If a user points the wireless portable terminal 11 to the access point 12, it is preferable to set a width of an infrared radiation beam larger than a width of a millimeter-wave antenna beam. By doing so, if the user points the infrared radiation beam to the access point 12 similarly to handling of a television remote controller, a millimeter-wave link is established.

Figure 6:
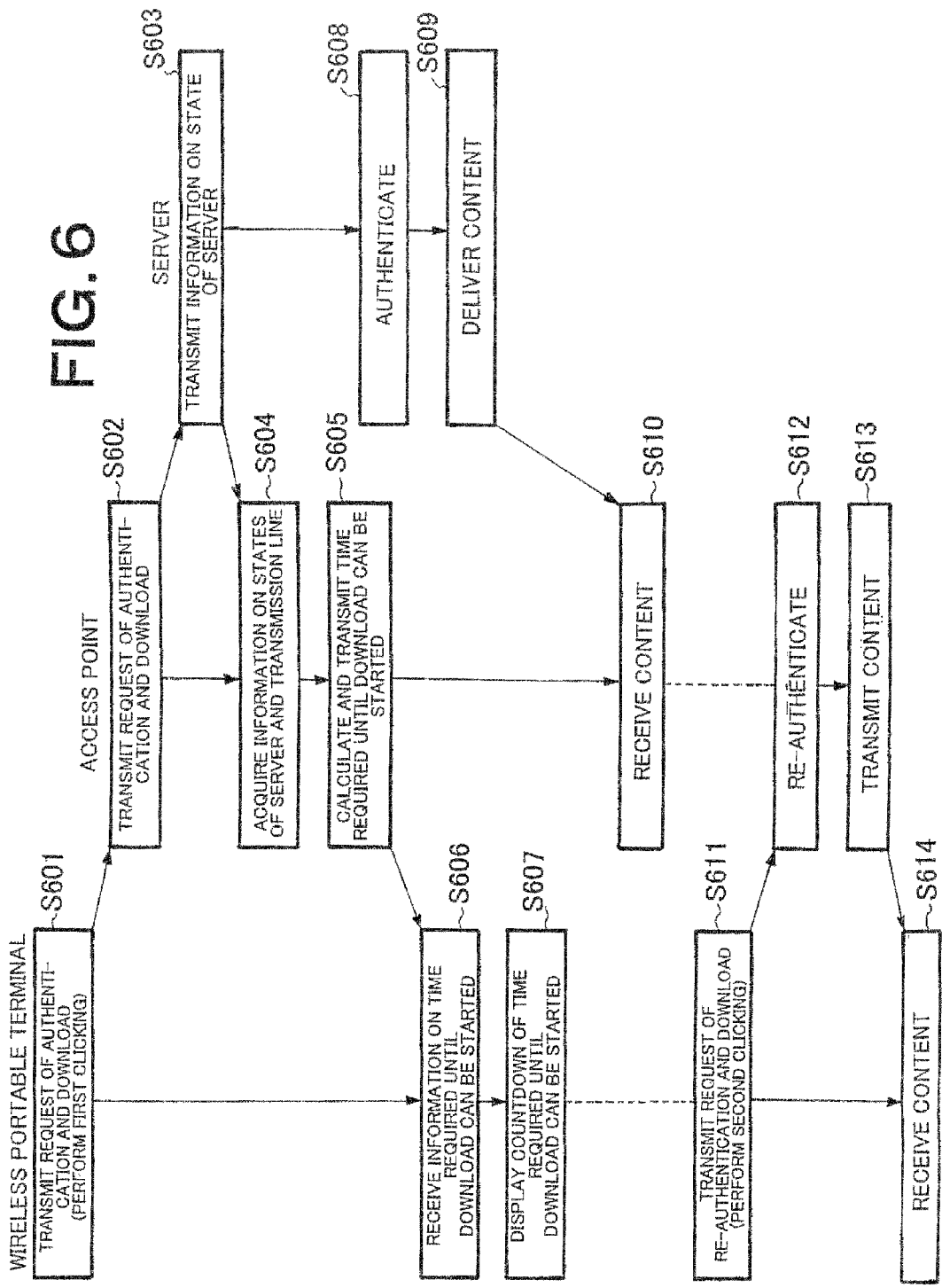
FIG. 6 is a flowchart showing an operation process of the content delivery system according to the first embodiment.

Referring to FIG. 6, an operation process will next be described. The user points the wireless portable terminal 11 to the access point 12, performs a first operation and transmits a request of authentication and download from the wireless portable terminal 11 to the access point 12 (S601). The user also transmits an ID and a password for the authentication from the wireless portable terminal 11 to the access point 12. This first operation means herein an operation that triggers the request of the authentication and the download such as depression of a switch mounted on the wireless portable terminal 11 or sound the user utters. Although a manner of an actual user's operation is not limited to a specific one, the first operation is also expressed as "clicking" by comparison to an operation of a mouse for a PC. The access point 12 receives a signal from the wireless portable terminal 11 and requests the server 13 to perform the authentication and the download (S602). The server 13 transmits information on a current situation (whether or not the server 13 is busy) (S603). The access point 12 acquires a capacity of a content, a situation of the server 13 and a transmission state between the access point 12 and the server 13 (S604), calculates time required until the download can be started and transmits information on the calculated time to the wireless portable terminal 11 (S605). The wireless portable terminal 11 receives the information on the time required until the download can be started (S606) and displays, for example, countdown until estimated time at which the download can be started (S607). During that time, the server 13 performs the authentication (S608) and, if the authentication is successful, delivers the content to the access point 12 (S609). The access point 12 receives the content (S610). Next, when the download can be started, the user performs a second clicking at the wireless portable terminal 11 to request the access point 12 to perform re-authentication and download (S611). If the download can be started, the access point 12 performs the re-authentication (S612). If the re-authentication is successful, then the access point 12 starts delivering the content to the wireless portable terminal 11 (S613) and the wireless portable terminal 11 receives the content (S614). If the time required until the download can be started differs from the initially estimated time and the user cannot download the content to the wireless portable terminal 11 at a timing of the second clicking, the access point 12 can re-estimate time and display countdown. Alternatively, the access point 12 may indicate time by sound or voice in place of display of the countdown. If the user cannot download the content to the wireless portable terminal 11 because of unsuccessful authentication or for some other reason, the access point 12 can transmit information on failure of the download to the wireless portable terminal 11. Furthermore, if the content is completely downloaded to the wireless portable terminal 11, accounting information can be recorded in the server 13.

According to the first embodiment of the present invention, the user can download the content to the wireless portable terminal 11 by pointing for minimum time among time required to deliver the content (from the server 13 to the access point 12 and from the access point 12 to the wireless portable terminal 11). It is, therefore, advantageously possible to reduce time required for the user to keep pointing the wireless portable terminal 11 to the access point 12 and relieve user's stress.

Figure 4:
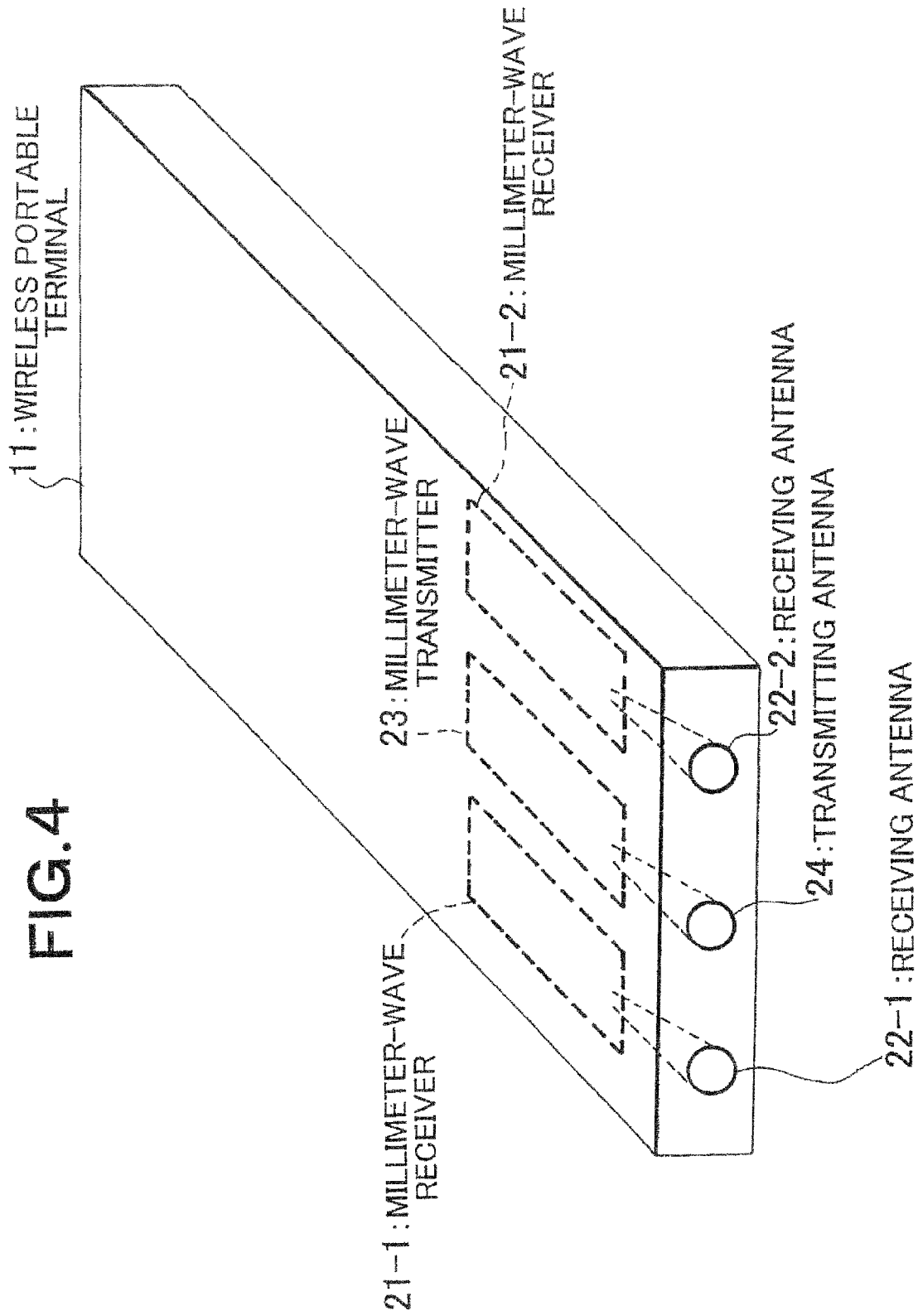
FIG. 4 is a schematic diagram showing a configuration of a wireless portable terminal according to a second embodiment of the present invention.
Figure 5:
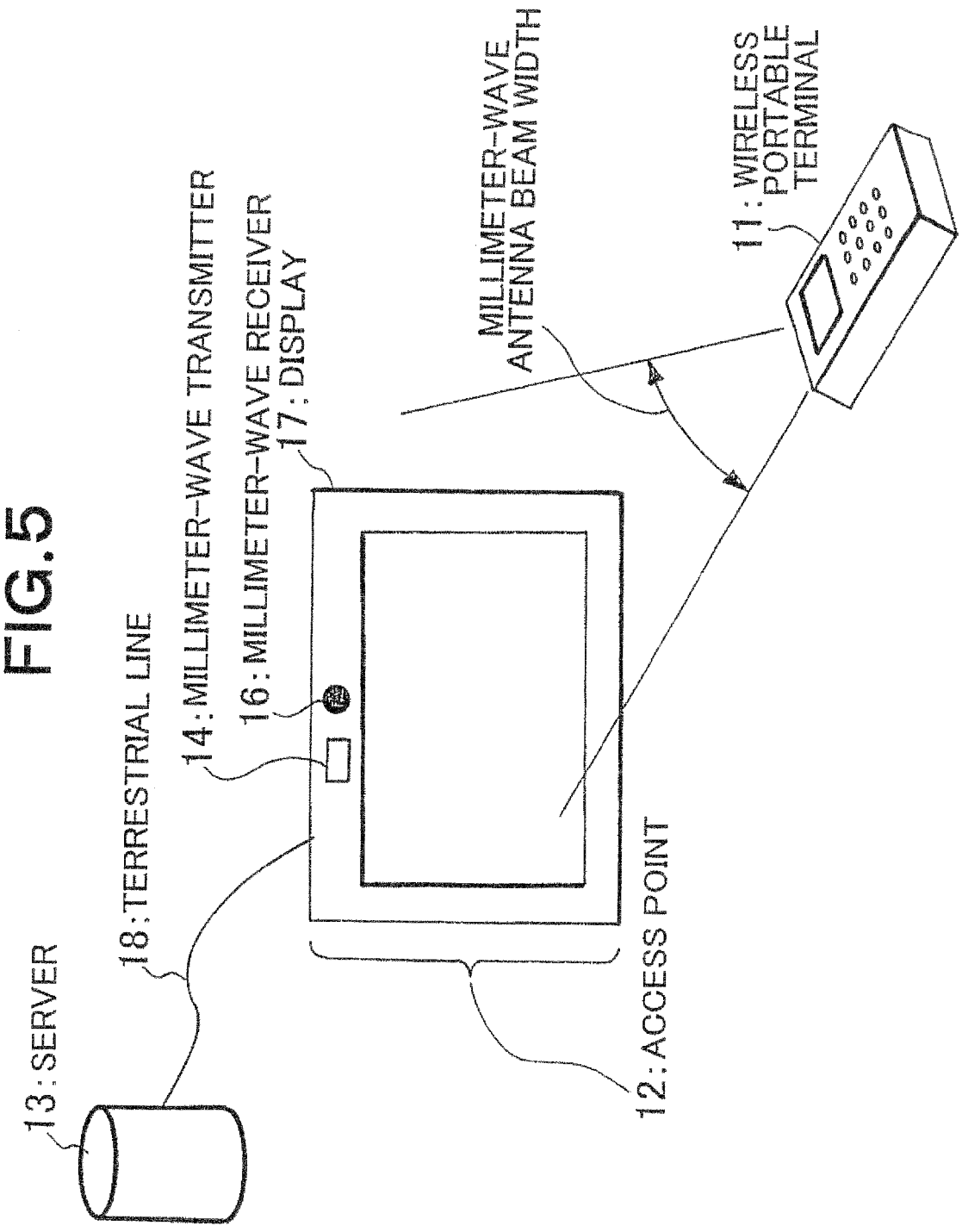
FIG. 5 is a schematic diagram showing a configuration of a content delivery system according to the second embodiment.

A second embodiment of the present invention will be described with reference to FIGS. 4 and 5. The second embodiment differs from the first embodiment in the following respects. As shown in FIG. 4, a wireless portable terminal 11 includes not the infrared transmitter 20 but a millimeter-wave transmitter 23 and also includes a transmitting antenna 24, whereby two-way millimeter-wave communication is held between the wireless portable terminal 11 and an access point 12. Furthermore, as shown in FIG. 5, the access point 12 includes not an infrared receiver but a millimeter-wave receiver 16. The second embodiment exhibits the same advantages as those of the first embodiment by the same operation process as that according to the first embodiment as long as a user is explained how to point the wireless portable terminal 11 to the access point 12 in advance.

Figure 7:
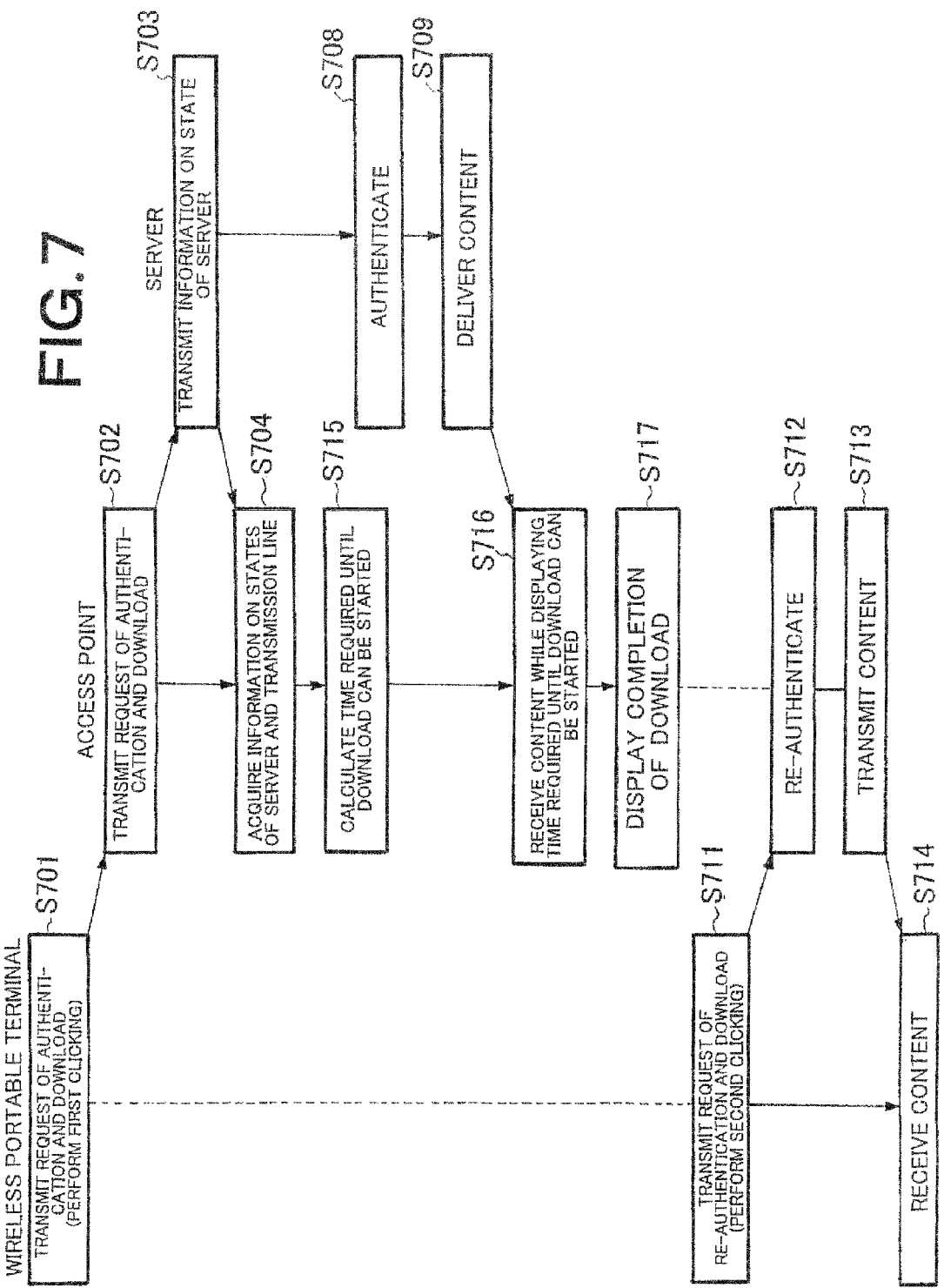
FIG. 7 is a flowchart showing an operation process of a content delivery system according to a third embodiment of the present invention.

A third embodiment of the present invention will now be described with reference to FIG. 7. It is to be noted that a content delivery system, a wireless portable terminal 11, an access point 12 and a server 13 used in the third embodiment are the same as those used in the first or second embodiment. A user points the wireless portable terminal 11 to the access point 12, performs a first clicking and transmits a request of authentication and download from the wireless portable terminal 11 to the access point 12 (S701). The access point 12 receives a signal from the wireless portable terminal 11 and requests the server 13 to perform the authentication and the download (S702). The server 13 transmits information on a current situation (whether or not the server 13 is busy) to the access point 12 (S703). The access point 12 acquires a capacity of a content, a situation of the server 13 and a transmission state between the access point 12 and the server 13 (S704), and calculates time required until the download can be started (S715). The access point 12 receives the content while displaying, for example, countdown on a display 17 provided in the access point 12 (S716). Next, when the download can be started from the access point 12 to the wireless portable terminal 11, the access point 12 displays information to the effect on the display (S717). At this time, the access point 12 may display the information after end of receiving the content at the access point 12 or display the information at an earlier time in consideration of the time required to download the content to the wireless portable terminal 11. In another alternative, the access point 12 may display information indicating a progress state of actual download (such as a ratio of an amount of downloaded data to a total data amount) in place of the information on time. In this case, the step S704 or 715 can be omitted. The user performs a second clicking at the wireless portable terminal 11 to request the access point 12 to perform re-authentication and download (S711). If the download can be started, the access point 12 performs the re-authentication (S712). If the re-authentication is successful, then the access point 12 starts delivering the content to the wireless portable terminal 11 (S713) and the wireless portable terminal 11 receives the content (S714). If the user cannot download the content to the wireless portable terminal 11 because of unsuccessful authentication or for some other reason, the access point 12 can transmit information on failure of the download to the wireless portable terminal 11. Furthermore, if the content is completely downloaded to the wireless portable terminal 11, accounting information can be recorded in the server 13. By performing a process according to the third embodiment, the third embodiment can exhibit the same advantages as those of the first embodiment.

Figure 8:
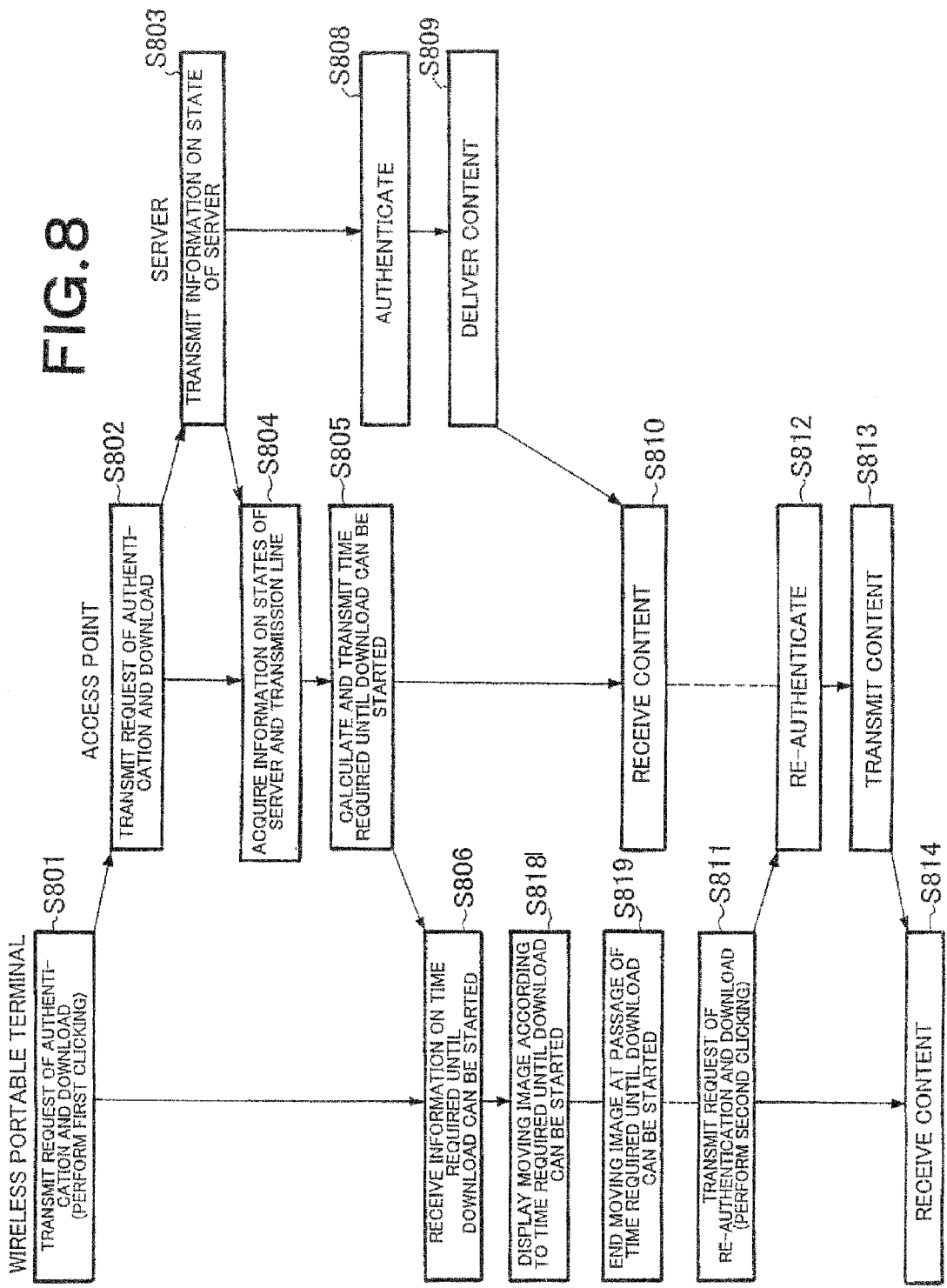
FIG. 8 is a flowchart showing an operation process of a content delivery system according to a fourth embodiment of the present invention.

A fourth embodiment of the present invention is similar to the first embodiment except for the following respects. As shown in FIG. 8, process steps (S818 and S819) of displaying a moving image according to time or a moving image indicating the time are added in place of displaying the time required until download can be started between the first clicking and the second clicking. Specifically, examples of the moving image include one in which water poured into a cup rises and the cup is filled with the water at a timing at which the download can be started. By performing a process according to the fourth embodiment, the fourth embodiment can exhibit the same advantages as those of the first embodiment. Furthermore, by using the moving image in place of the display of time, it is possible to further relieve user's stress during waiting. Alternatively, similarly to the third embodiment, the moving image may be displayed not by a wireless portable terminal 11 but on a display 17 provided in an access point 12.

Figure 9:
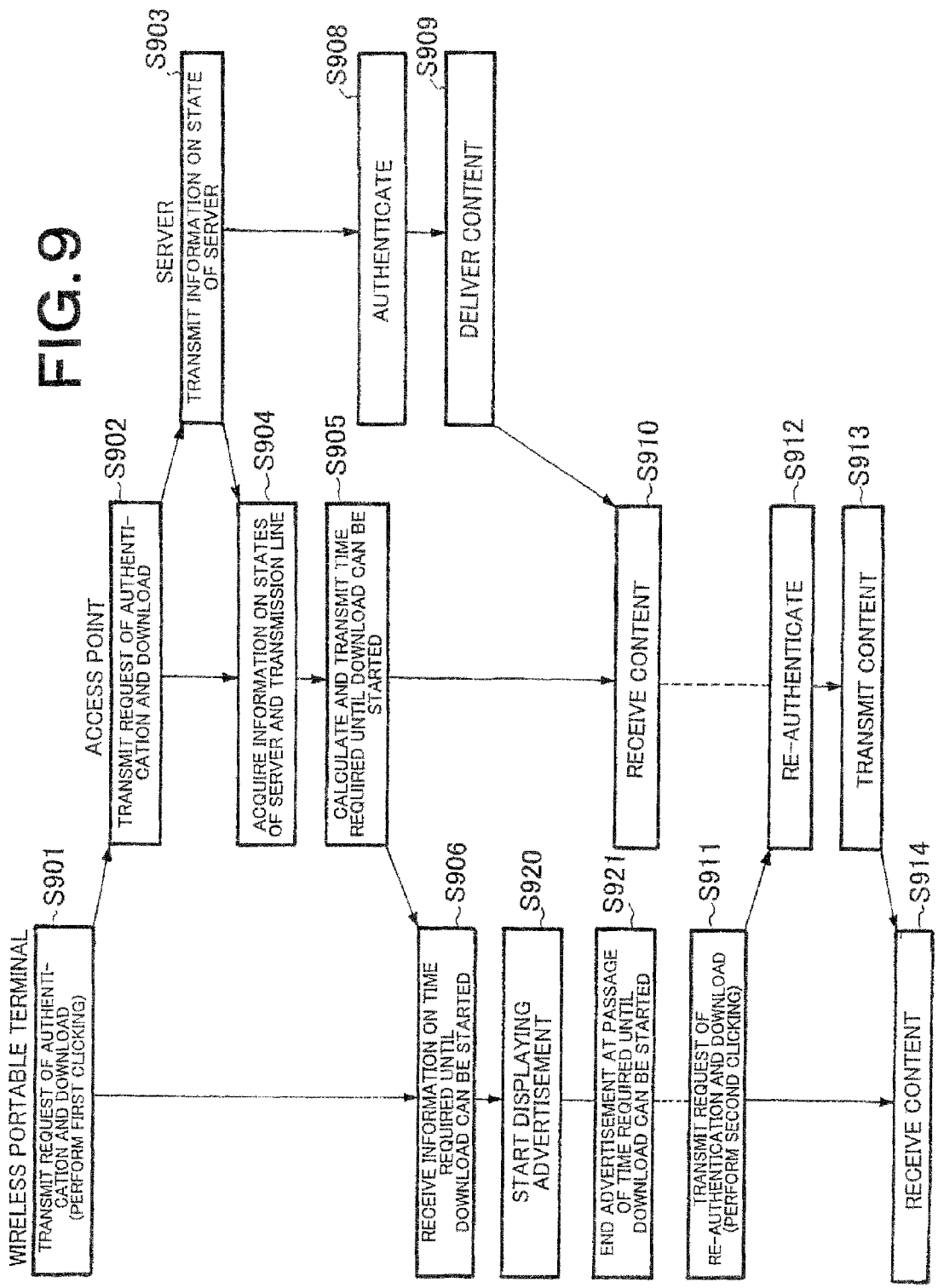
FIG. 9 is a flowchart showing an operation process of a content delivery system according to a fifth embodiment of the present invention.
Figure 10:
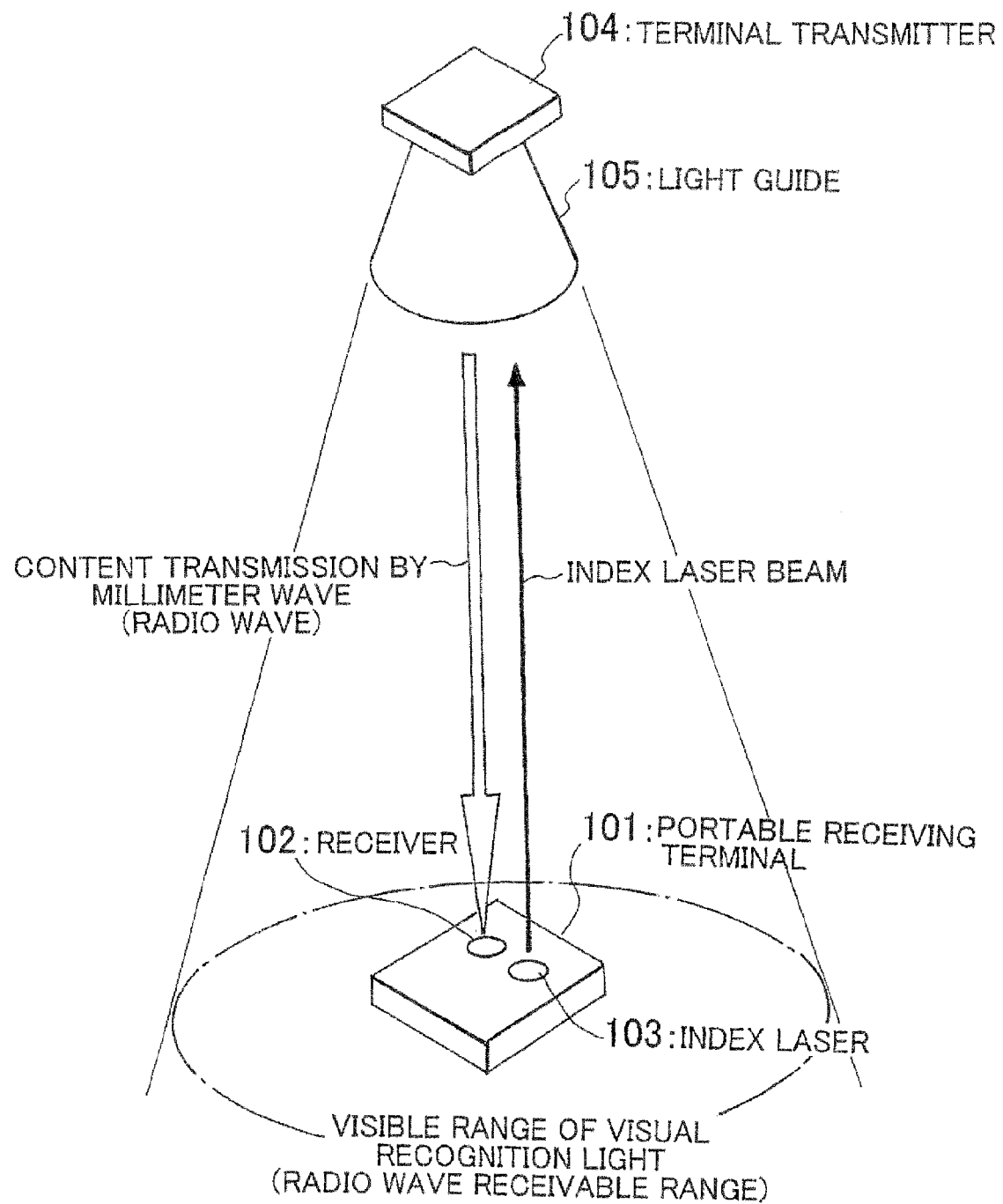
FIG. 10 is a schematic diagram of a usual content delivery system.

A fifth embodiment of the present invention is similar to the fourth embodiment except for the following respects. As shown in FIG. 9, process steps (S920 and S921) of displaying an advertisement in place of displaying the moving image between the first clicking and the second clicking. In a process according to the fifth embodiment, a service provider can deliver advertisement information and the delivery possibly becomes a source of income of the service provider. Moreover, if not only the advertisement information but also related information to the downloaded content is provided, user's waiting time is made useful. Alternatively, similarly to the third embodiment, the advertisement may be displayed not by a wireless portable terminal 11 but on a display 17 provided in an access point 12.

Although the exemplary embodiments of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

This application is based upon and claims the benefit of priority from Japanese Patent Application No. 2006-37905, filed on Nov. 14, 2006, the disclosure of which is incorporated herein in its entirety by reference.

According to the present invention, a user can easily use high-speed download of data to a directional wireless portable terminal whether the user uses the terminal indoor or outdoor.

What is claimed is:

1. A content delivery system, comprising:
   a wireless portable terminal that includes a directional wireless carrier transmitter and a directional millimeter-wave receiver;
   an access point that receives a content from a server and transmits the content to the wireless portable terminal, and
   a server that delivers the content to the access point, wherein
   the directional wireless carrier transmitter performs transmission of a first signal indicating a request for conducting first authentication of the wireless portable terminal and for transmitting the content from the server to the access point, to the server via the access point, said transmission of the first signal being triggered by a first operation at the wireless portable terminal;
   the first authentication is conducted;
   the access point performs first transmission of the content and accumulates the content upon the first authentication being successful;
   the directional wireless carrier transmitter performs transmission of a second signal indicating a request for transmitting the content from the access point to the wireless portable terminal, said transmission of the second signal being triggered by a second operation at the wireless portable terminal; and
   the directional millimeter-wave receiver performs second transmission of the content accumulated in the access point from a millimeter-wave transmitter included in the access point, said second transmission of the content being triggered by the second signal.

2. The content delivery system according to claim 1, wherein a wireless carrier used in the directional wireless carrier transmitter is an infrared ray or a visible ray.

3. The content delivery system according to claim 1, wherein a wireless carrier used in the directional wireless carrier transmitter is a millimeter wave.

4. The content delivery system according to claim 1, wherein the wireless portable terminal includes a function of displaying time required until the second transmission can be started after performing the first operation.

5. The content delivery system according to claim 4, further comprising:
   a function of calculating the time required until the second transmission can be started in view of a capacity of the content, a communication environment between the server and the access and an operating situation of the server, and of displaying the time.

6. The content delivery system according to claim 4, further comprising:
   a function of displaying the time required until the second transmission can be started by countdown or of displaying a moving image that allows recognition of the time.

7. The content delivery system according to claim 1, wherein the access point includes a function of displaying time required until the second transmission can be started after performing the first operation.

8. The content delivery system according to claim 1, wherein the transmission of the first signal is conducted during the directional wireless carrier transmitter is pointing to the access point.

9. The content delivery system according to claim 1, wherein said second transmission of the content is triggered by the second signal if the second authentication is successful.

10. The content delivery system according to claim 1, wherein a second authentication of the wireless portable terminal is conducted in response to the second signal, and
    the transmission of the second signal is conducted during the directional wireless carrier transmitter is pointing to the access point.

11. A content delivery method for a content delivery system that includes a wireless portable terminal that includes a directional wireless carrier transmitter and a directional millimeter-wave receiver; an access point that receives a content from a server and transmits the content to the wireless portable terminal; and a server that delivers the content to the access point, the method comprising:
    a step in which the wireless portable terminal inputs a first operation;
    a step in which the directional wireless transmitter performs transmission of a first signal indicating a request for conducting authentication of the wireless portable terminal and for transmitting the content from the server to the access point, to the server via the access point, said transmission of the signal being triggered by the first operation;
    a step in which the access point performs first transmission of the content from the server, said first transmission of the content being triggered by the first signal and accumulates the content upon the authentication being successful;
    a step in which the wireless portable terminal inputs a second operation;
    a step in which the directional wireless carrier transmission performs transmission of a second signal indicating a request for transmitting the content from the access point to the wireless portable terminal, said transmission of the second signal being triggered by a the second operation at the wireless portable terminal; and
    a step in which the directional millimeter-wave receiver performs second transmission of the content accumulated in the access point from a millimeter-wave transmitter included in the access point, said second transmission of the content being triggered by the second signal.

12. The content delivery method according to claim 11, further comprising:
    causing the wireless portable terminal to display time required until the second transmission can be started after the performing of the first operation.

13. The content delivery method according to claim 12, further comprising:
    calculating the time required until the second transmission can be started in view of a capacity of the content, a communication environment between the server and the access point and an operating situation of the server, and displaying the time.

14. The content delivery method according to claim 12, further comprising:
    displaying the time required until the second transmission can be started by countdown or displaying a moving image that allows recognition of the time after the performing of the first operation.

15. The content delivery method according to claim 11, wherein the access point includes a function of displaying time required until the second transmission can be started after the performing of the first operation.

16. The content delivery method according to claim 11, wherein the transmission of the first signal is conducted during the directional wireless carrier transmitter is pointing to the access point.

17. The content delivery method according to claim 11, wherein the transmission of the second signal is conducted during the directional wireless carrier transmitter is pointing to the access point.

18. The content delivery method according to claim 11, further comprising a step of conducting a second authentication of the wireless portable terminal in response to the second signal,
wherein the transmission of the second signal is conducted during the directional wireless carrier transmitter is pointing to the access point.

* * * * *